United States Patent [19]
Fiedler et al.

[11] Patent Number: 5,924,326
[45] Date of Patent: Jul. 20, 1999

[54] ARRANGEMENT FOR ADJUSTING THE AXIAL PLAY OF A SHAFT USING A BUFFER COMPONENT

[75] Inventors: Rudolf Fiedler, Bad Mergentheim; Holger Hamann, Sommerhausen, both of Germany

[73] Assignee: Siemens Aktiengesellschaft, Munich, Germany

[21] Appl. No.: 08/822,644

[22] Filed: Mar. 24, 1997

[30] Foreign Application Priority Data

Mar. 28, 1996 [EP] European Pat. Off. ............... 96105003

[51] Int. Cl.⁶ .................................................... F16H 35/08
[52] U.S. Cl. ................................. 74/400; 74/409
[58] Field of Search ............... 74/400, 409, 425

[56] References Cited

U.S. PATENT DOCUMENTS 3,848,477 11/1974 Giandinoto et al. ...................... 74/425

FOREIGN PATENT DOCUMENTS

| | | |
|---|---|---|
| 0133527 | 2/1985 | European Pat. Off. . |
| 0563410 | 10/1993 | European Pat. Off. . |
| 563410 | 10/1993 | European Pat. Off. ................. 74/400 |
| 2347812 | 11/1977 | France . |
| 3344249 | 4/1985 | Germany . |
| 4123785 | 1/1993 | Germany . |

*Primary Examiner*—Charles A. Marmor
*Assistant Examiner*—David Fenstermacher
*Attorney, Agent, or Firm*—Sughrue, Mion, Zinn, Macpeak & Seas, PLLC

[57] ABSTRACT

In order to be able to adjust the axial play of a shaft in a shaft holder using a universal buffer component (1) for each unit in a production series, despite a wide tolerance range within the series, a buffer component is mounted so as to be rotatable in the shaft holder (3) at right angles to the axis of the shaft (2). The buffer component (1) is further provided with a circumferential buffer surface which is eccentric with respect to its axis of rotation (4.1). This buffer surface preferably follows an Archimedean spiral and is advantageously made up of individual buffer surfaces (F1–F14). The surfaces (F1–F14) extend tangentially to the Archimedean spiral and each have a buffer region disposed at right angles to the shaft (2). The buffer region is radially set back relative to the trailing edge of the buffer surface in the direction of rotation. The length of this set back corresponds to the desired, nominal axial play ("a") to be set for the shaft (2).

39 Claims, 6 Drawing Sheets

ARRANGEMENT FOR ADJUSTING THE AXIAL PLAY OF A SHAFT USING A BUFFER COMPONENT

FIELD OF AND BACKGROUND OF THE INVENTION

The invention relates to new and useful improvements in an arrangement for adjusting the axial play of a shaft mounted in a shaft holder. More particularly, the invention relates to an arrangement for adjusting the axial play between a shaft and a buffer component which can be fixed in the shaft holder. The shaft provided can be, in particular, a motor-gear shaft, in which case the shaft holder is a gear case. The motor-gear has application, for instance, in motor-vehicle adjusting drives used, e.g. for window or sliding roof adjustment.

EP 0 133 527 (B2) discloses an axial-play adjustment method carried out, e.g., as part of the final assembly process. On the basis of an individual comparison between an actual axial play and a desired, nominal axial play, a buffer washer of appropriate thickness is fixed at right angles to the axis of the shaft in a pocket of the shaft holder. A variety of washers with appropriate differences in thickness are provided for this purpose, and one is selected in accordance with the particular compensation required. As an alternative to the variety of washers, a universal buffer washer, into which an axial boss that differs in axial width in accordance with the respective difference between the actual axial play in the unit being adjusted and the desired axial play, may be arranged in the buffer zone instead.

DE 33 44 249 (C2) discloses another arrangement for adjusting the axial play, in which a buffer washer with different axially projecting steps is rotated about a pivot extending parallel to the shaft until the respective difference between the actual axial play and the nominal axial play is compensated. In the final set position, the buffer washer is pressed continuously against the shaft by means of an axial spring.

DE 41 23 785 (A1) discloses an electric motor with automatic axial-play adjustment. This is achieved by an eccentric that is mounted so as be rotatable about an axis at right angles to the motor shaft. The eccentric is pressed continuously as a buffer component against its associated shaft end by a spring-loaded tension element.

OBJECTS OF THE INVENTION

It is a first object of the invention to provide an arrangement for adjusting the axial play of a shaft which ensures that the shaft, following adjustment, will operate with minimal wear and low noise. An additional object is to provide an arrangement that is cost-efficient in terms of both manufacture and assembly. It is yet another object of the invention to provide an arrangement that promotes quick, efficient and accurate adjustment of axial play and that allows axial play to be adjusted in discrete, predetermined steps. A further object of the invention is to provide a user-friendly and effective method for adjusting the axial play of a shaft.

SUMMARY OF THE INVENTION

These and other objects are achieved by the teachings as set forth in the independent claims below. Particularly advantageous refinements of the invention are the subject matter of the dependent claims.

According to one formulation of the invention, the invention provides an arrangement for performing an adjustment of an axial play between a shaft and a buffer component securable in a shaft holder. The adjustment adjusts an actual axial play, arising from manufacturing tolerances, to a desired axial play. The arrangement includes: a) means for mounting the buffer component in the shaft holder so as to be rotatable, during the adjustment of the axial play, about a pivot axis extending essentially orthogonally to a lengthwise axis of the shaft; b) means for mounting the buffer component in the shaft holder so as to be fixed, without support from the shaft, following the adjustment of the axial play; and c) a circumferential buffer surface provided on the buffer component and extending eccentrically relative to the pivot axis. The buffer surface has both a minimum radial distance and a maximum radial distance from the pivot axis. Moreover, the difference between the minimum and the maximum radial distance encompasses the complete range of the actual axial play between the buffer component and the shaft arising from the manufacturing tolerances.

The arrangement according to the invention makes it possible, by means of a universal buffer component and a simple adjusting operation, to perform accurate axial play adjustments even in the case of relatively large tolerances. The invention also avoids the drawback exhibited by certain conventional arrangements of having the buffer component exert continuous pressure against the shaft. Such continual pressure is undesirable, for instance, because it promotes wear in the parts and contributes to noise.

The arrangement for adjusting the axial play is further improved, without the need for any additional measuring or adjusting means, if the buffer component has a circumferential buffer surface made up of adjoining individual buffer surfaces. Advantageously, the individual buffer surfaces extend in each case tangentially to an Archimedean spiral defining an eccentric formation of the circumferential surface. Each buffer surface has a buffer region which is disposed at right angles to the shaft. In addition, the buffer component allows a desired, nominal axial play to be set, in effect, automatically. Specifically, the geometry of the circumferential buffer surface is such that the point of tangency of each buffer surface will be offset from the radius of the buffer component by an amount less than the radial offset of a trailing outer edge of the buffer surface. This being the case, if the difference in radial offsets corresponds to the nominal axial play, the buffer component can simply be rotated forward until the trailing outer edge contacts the end of the shaft, then rotated slightly backward until the point of tangency is level with the shaft, and finally secured.

BRIEF DESCRIPTION OF THE DRAWINGS

The invention and further advantageous refinements of the invention according to the features of the dependent claims are explained in more detail below with the aid of diagrammatic, exemplary embodiments in the drawing, in which:

DETAILED DESCRIPTION OF THE PREFERRED EMBODIMENTS

Figure 8:
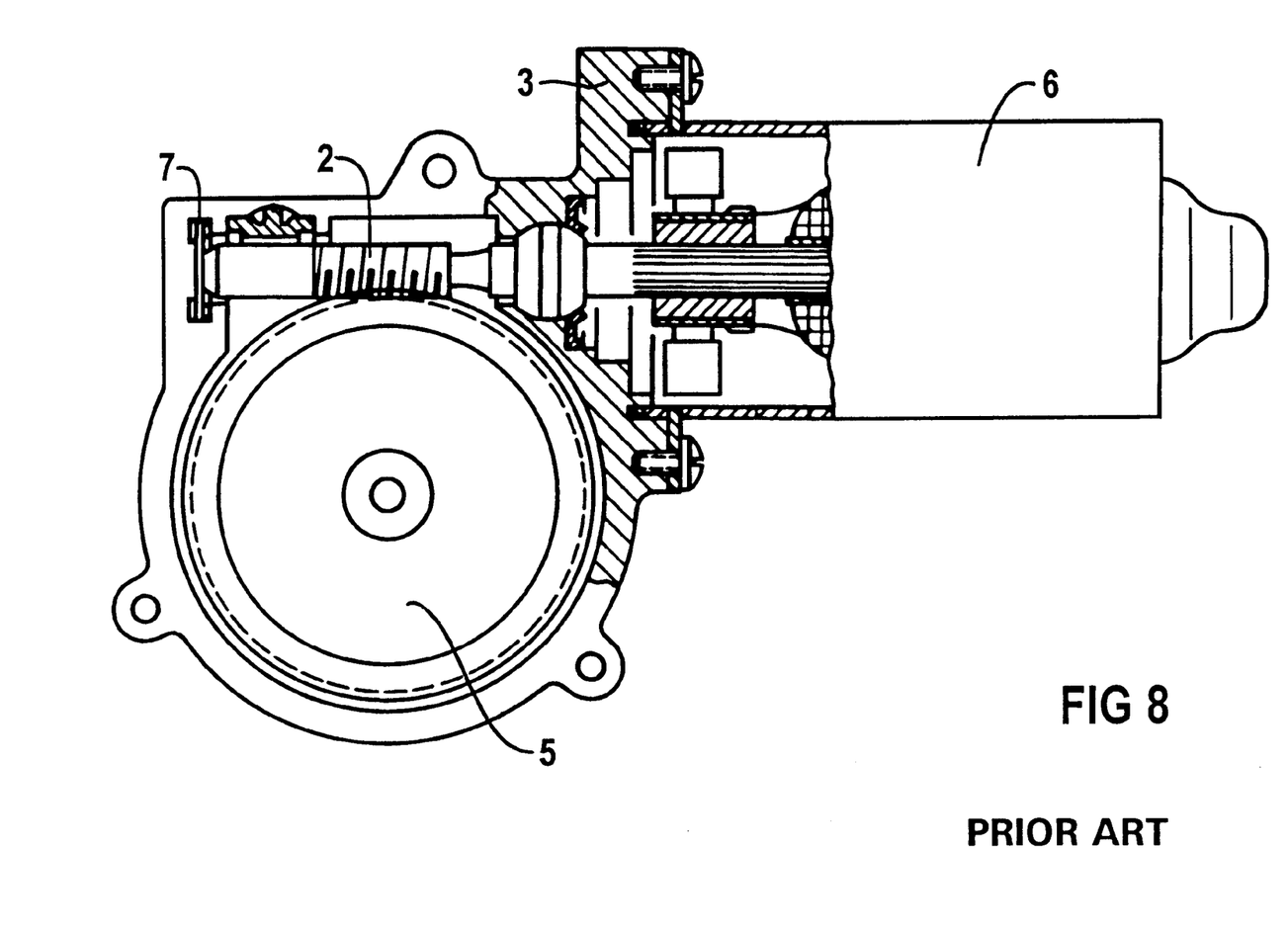
FIG. 8 shows a partially sectional side view of a motor-gear adjusting drive having a conventional axial-play adjustment arrangement in which buffer washers of different thickness are selected for insertion into the shaft holder.

FIG. 8 shows a motor-gear adjusting drive, known from EP 0 133 527 (B2), for a motor-vehicle window lifter. The drive includes, inter alia, a gear case 3 functioning as a shaft holder for a motor-gear shaft 2, and an electric motor 6 flanged to the gear case. The motor shaft 2, which extends into the gear case 3, drives a gear wheel 5 as a worm shaft. Owing to manufacturing tolerances both of the shaft holder 3 and of the electric motor 6, as well as, in particular, to the tolerances arising from coupling these components together, there may, in certain circumstances, be differences from one drive to the next in the amount of axial play existing between the shaft 2 and its shaft holder 3 following assembly. For reasons of noise, smoothness of operation, etc., this axial play should not exceed a given maximum. Therefore, for each individual drive, it becomes necessary to set the axial play, based on a comparison of the respective actual axial play with the permissible, nominal axial play.

In the conventional case mentioned above, buffer washers 7 are inserted for this purpose into a pocket in the shaft holder 3, at right angles to the axis of the shaft 2. Depending on the difference between the actual axial play and the nominal axial play, as measured for each drive individually, it will be necessary to choose and insert a buffer washer 7 of appropriate thickness. Alternatively, buffer bosses with appropriate differences in axial thickness must be provided in a universal buffer washer.

The arrangement for adjusting the axial play in accordance with the present invention is considerably more advantageous in terms of manufacturing outlay and ease of assembly than is the conventional art. At the same time, the inventive arrangement is advantageously capable of being mounted without being supported against the shaft in the shaft holder. These and other aspects and advantages of the present invention are explained in greater detail below, with reference to FIGS. 1 to 7.

Figure 1:
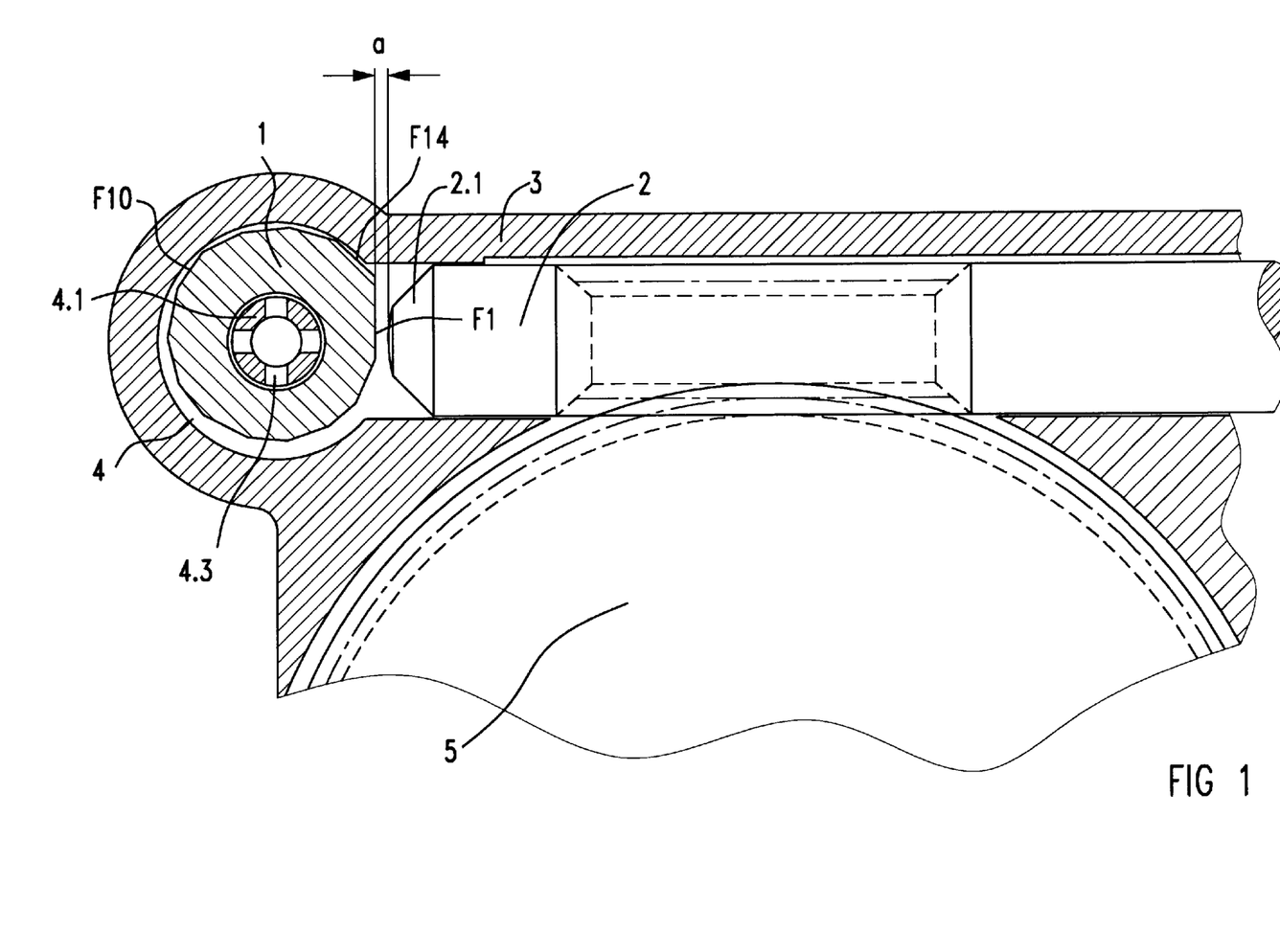
FIG. 1 shows, in an axial, partial sectional representation of a gear case, an axial plan view of a buffer component rotatably mounted in an opening in the gear case.

The buffer component 1 can be inserted into a potshaped orifice 4 in the gear case 3. The gear case 3 is provided as a shaft holder 3 for the shaft 2. The end of the shaft 2 is provided with a buffer tip 2.1, which lies in opposition to the circumferential surface of the buffer component 1.

To facilitate the adjustment of the axial play for each individual unit, the circumferential surface of the buffer component 1 is arranged to be perpendicular to the axis of the shaft 2. According to an advantageous refinement of the invention, the circumferential surface of the buffer component 1 is made up of a series of adjoining individual buffer surfaces distributed around the circumference. In the embodiment illustrated in FIG. 1, a total of fourteen individual buffer surfaces F1–F14 are provided. The individual buffer surfaces F1–F14 each extend tangentially to an Archimedean spiral (clothoid) that defines the eccentric shape of the circumferential surface of the buffer component 1.

FIG. 1 shows the buffer component 1 in the position in which the distance "am" between the buffer tip 2.1 of the shaft 2 and the circumferential surface lying opposite and at right angles to the axis of the shaft 2 (in the illustrated case, individual buffer surface F1) is at its greatest. According to the invention, the individual buffer surfaces F1–F14 are at their smallest radial distance from the pivot 4.1 of the buffer component 1 in an intermediate region of the buffer surfaces F1–F14. In particular, the intermediate region of a given buffer surface F1–F14 is located between the leading edge of that buffer surface and the trailing edge of that buffer surface. In addition, when the intermediate region is positioned on the axis of the shaft 2, the given buffer surface lies at right angles to the axis of the shaft 2. Given such an arrangement, the difference between the axial distance from the trailing edge of a given buffer surface to the shaft 2, on the one hand, and the axial distance from the intermediate position of the given buffer surface to the shaft 2, on the other hand, corresponds, in the case of each individual buffer surface, to the maximum axial play to be set for the shaft in the gear housing.

When the buffer component 1 is rotated counter-clockwise out of the position illustrated in FIG. 1, the axial play decreases to an ever greater extent due to the eccentric widening of the circumferential surface. Eventually, rotation is inhibited by virtue of the fact that the axial play between the buffer tip 2.1 of the shaft 2, on the one hand, and the individual buffer surface then situated opposite the buffer tip 2.1, on the other, has fallen to zero. By turning the buffer component 1 back in the clockwise direction as far as the intermediate position in which the last-mentioned individual buffer surface is at right angles to the axis of the shaft 2, the desired permissible axial play is assured. The buffer component can then be fixed in this position, as explained in greater detail below in particular with reference to FIGS. 6 and 7.

Figure 2:
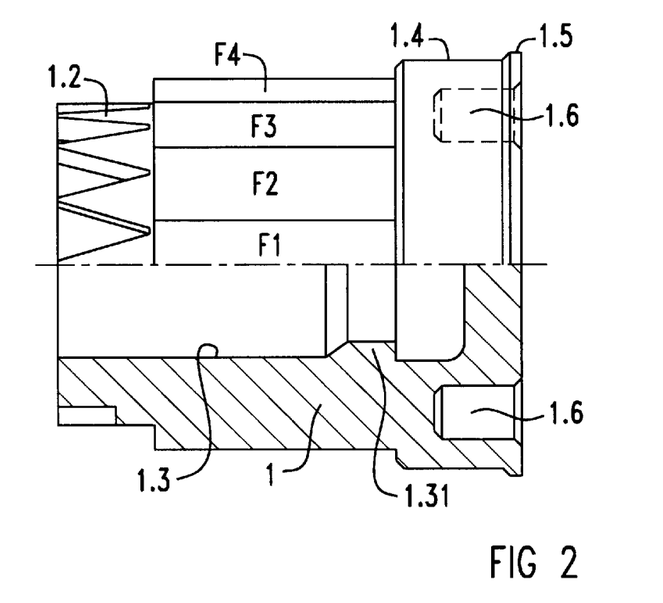
FIG. 2 shows the buffer component of FIG. 1 in partial axial side view and partial section.
Figure 3:
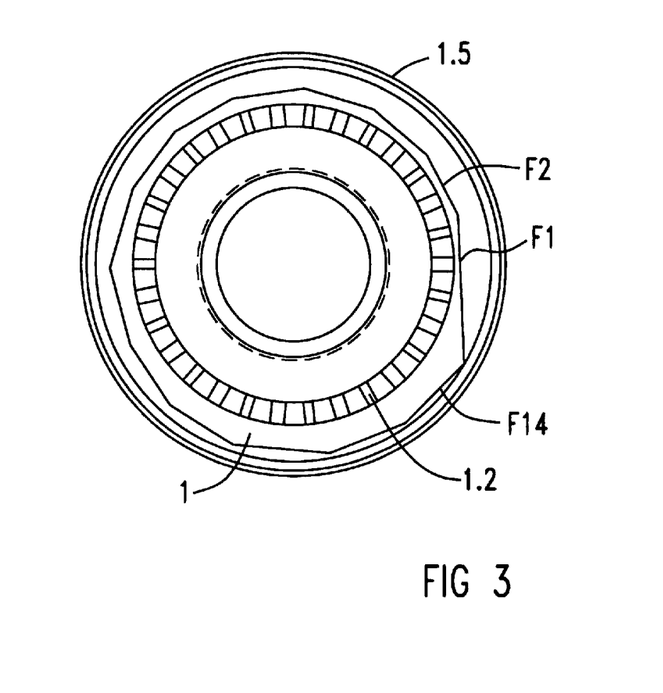
FIG. 3 shows the buffer component of FIG. 1 in an axial end view.
Figure 4:
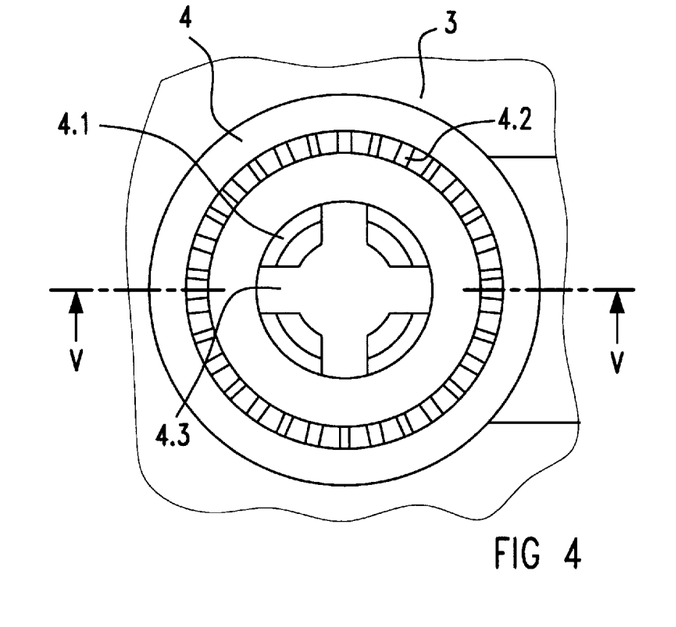
FIG. 4 shows a cylindrical opening accommodating the buffer component, in a plan view onto the inside bottom surface of the opening.
Figure 5:
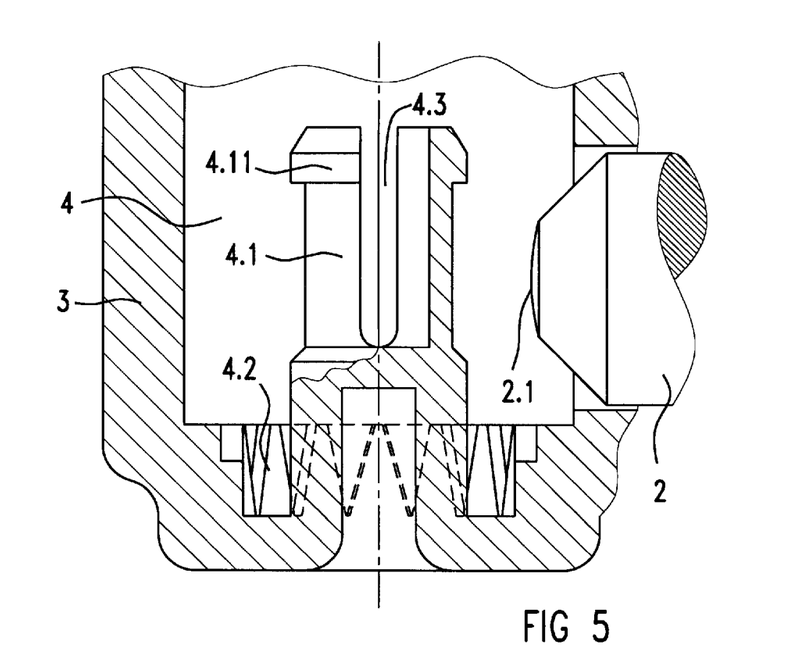
FIG. 5 shows the cylindrical opening of FIG. 4, in an axial sectional representation taken along the line V—V of FIG. 4.

FIG. 2 shows, in a partial axial side view and partial axial section, a universal buffer component 1 which can be inserted into an orifice 4 of the gear case 3. FIG. 3 shows the same universal buffer component in an end view, while FIGS. 4 and 5 show the orifice of the gear case 3. The buffer component 1 has a rotary sleeve 1.3 which can be pushed axially and at right angles to the axis of the shaft 2 onto a journal 4.1 provided as a pivot in the orifice 4. This sleeve and journal arrangement for assembling the buffer component 1 in the orifice 4 is advantageous in terms of manufacture and, especially, installation.

Figure 6:
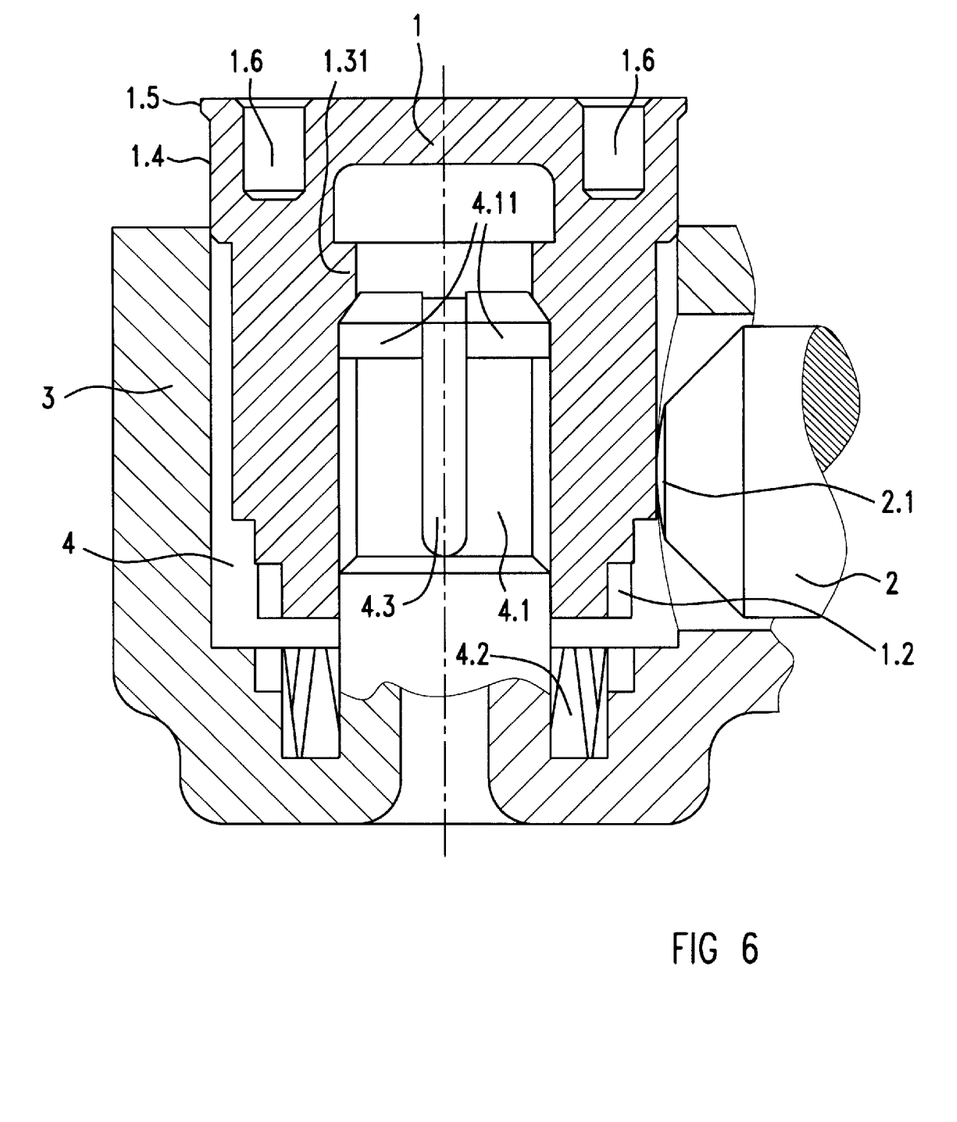
FIG. 6 shows the buffer component partly inserted into the cylindrical opening, and occupying a first axial position appropriate for axial play adjustment.
Figure 7:
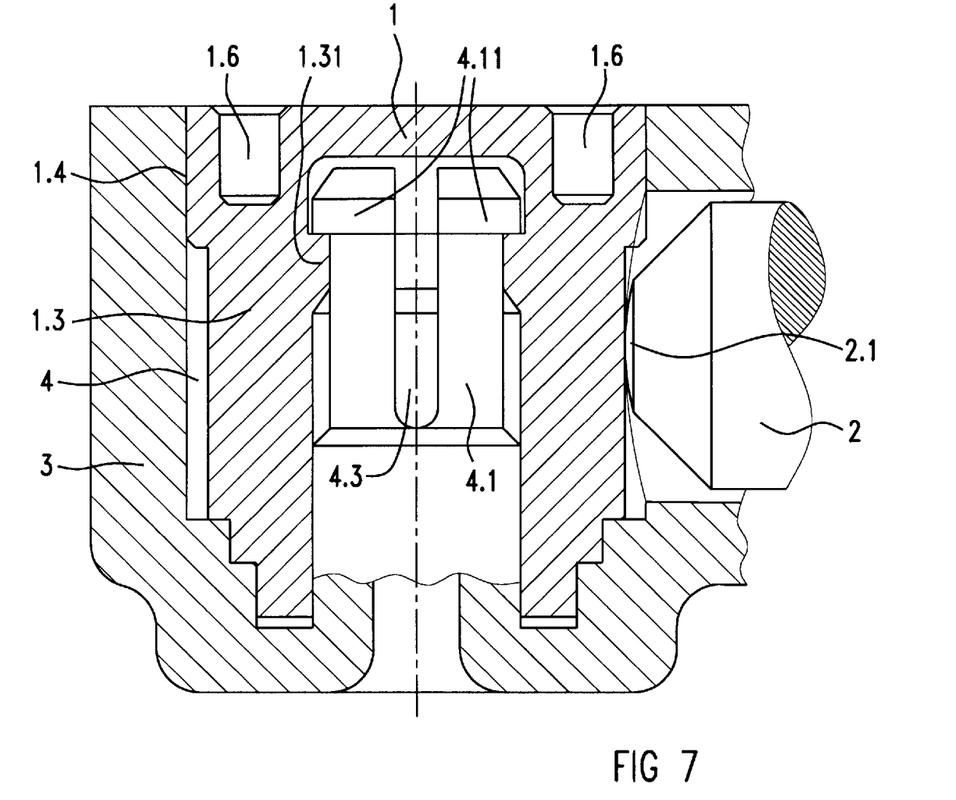
FIG. 7 shows the buffer component of FIG. 6 inserted completely into the cylindrical opening, corresponding to a second inserted position appropriate for alignment and fixing.

In order to perform the rotary adjustment of the buffer component 1, the buffer component 1 is first of all moved into a first axial insertion position in the orifice 4, as illustrated in FIG. 6. In this first position, the buffer component 1 can be guided, on the one hand, on a journal nose ring 4.11 of the pivot 4.1 and, on the other hand, by a guide surface 1.4 on the inner rim of the orifice 4. As such, while in the first axial position, the buffer component 1 is rotated to select an appropriate buffer surface, as described above.

Once the desired buffer surface is found, the buffer component 1 is secured rotationally and axially by moving it from the first axial position to a second axial position. To assist this process, the journal nose ring 4.11 is advantageously tapered conically counter to the direction in which the rotary sleeve 1.3 is pushed on and/or is designed to be elastically flexible by means of axial spring slots 4.3. To further simplify the rotary setting and axial pushing of the buffer component 1, sockets 1.6, designed for receiving an auxiliary turning tool (not shown), are formed in the outer end face of the buffer component.

As described previously, the axial play is set by rotating the buffer component 1 in the counter-clockwise direction until the play between the last individual buffer surface and the buffer tip 2.1 of the shaft 2 has fallen to zero. To ensure the desired axial play, the buffer component 1 then has to be turned back until the individual buffer surface defined by the inhibition of rotation is at right angles to the axis of the shaft 2. In order to ensure that this reverse rotation is self-initiating and accurate, a preferred embodiment of the invention provides for the buffer component 1 and the orifice 4 in the shaft holder 3 to be provided with opposing, mutually corresponding guide noses 1.2 and 4.2, respectively. As evident from FIGS. 2 and 5, these guide noses 1.2 and 4.2 have corresponding, complementary guide surfaces which slide axially against one another. The location of the guide noses is selected to bring the individual buffer surfaces automatically into alignment substantially at right angles with the axis of the shaft 2. In the present case, the guide noses 1.2 and 4.2 of the buffer component 1 and orifice 4, respectively, are designed and arranged circumferentially as teeth with conically extending flanks. Given this design, when the buffer component 1 is moved axially from the first axial insertion position (used for aligning and shown in FIG. 6) into the second axial insertion position (used for fixing and shown in FIG. 7), the buffer component 1 is aligned in such a way that the respective individual buffer surface lying opposite the shaft 2 is positioned substantially at right angles to the axis of the shaft 2, thereby automatically ensuring the desired axial play. When the second axial insertion position for aligning and fixing the buffer component 1 is reached, the buffer component 1 is secured positively in the opposite axial direction by an advantageous automatic snap-locking arrangement. For this purpose, the buffer component 1 is provided, in the manner of an undercut, with an annular snap ring 1.31, which snaps in behind a corresponding journal-nose ring 4.11 of the journal provided as the pivot 4.1.

It is advantageous if both the buffer component 1 and the shaft holder 3 having the orifice 4 are each produced in one piece as a unitary element, including their guiding and locking means. In particular, each of these two pieces can be fashioned as a plastic injection-molded part.

For simple, moisture-tight installation of the buffer component 1 in the shaft holder 3, the buffer component 1 is advantageously designed, at its end remote from the guide noses 1.2, in the form of a cover. The cover can be sealed off relative to the wall of the orifice 4 either at its guide surface 1.4 or an outer rim 1.5 projecting above the surface 1.4. The cover can be closed over the orifice, e.g., through adhesive bonding, screw-fastening or, in particular, welding.

It should be evident that, given the arrangement according to the invention for adjusting the axial play, the axial play can be set without complicated installation or setting procedures. Further, the invention is capable of fixing the necessary residual play without needing to press the buffer part constantly axially against the shaft. With the use of just one universal buffer component, the invention additionally is able to absorb excessive axial play in spite of potentially wide tolerance ranges for a production series. This is accomplished by virtue of the fact that the buffer component is mounted in the shaft holder in such a way as to be rotatable at right angles to the axis of the shaft and is provided with a circumferential buffer surface eccentric to its axis of rotation. This circumferential buffer surface advantageously is composed of individual buffer surfaces which preferably extend tangentially to an Archimedean spiral and/or each have a buffer region. The buffer region is disposed at right angles to the shaft and is set back radially relative to the radius of the outer edge of the buffer surface at the trailing end in the direction of rotation. The amount of set back corresponds to the amount of desired, nominal axial play to be set for the shaft.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. An arrangement for performing an adjustment of an axial play between a shaft and a buffer component securable in a shaft holder, whereby the adjustment adjusts an actual axial play, arising from manufacturing tolerances, substantially to a desired axial play, the arrangement comprising:
   a) means for mounting the buffer component in the shaft holder so as to be rotatable, during the adjustment of the axial play, about a pivot axis extending essentially orthogonally to a lengthwise axis of the shaft;
   b) means for mounting the buffer component in the shaft holder so as to be rotationally fixed, without support from the shaft, following the adjustment of the axial play; and
   c) a circumferential buffer surface provided on the buffer component and extending eccentrically relative to the pivot axis, said buffer surface having both a minimum radial distance and a maximum radial distance from the pivot axis; wherein
      a difference between the minimum and the maximum radial distance comprises a complete range of the actual axial play between the buffer component and the shaft arising from the manufacturing tolerances.

2. The arrangement as claimed in claim 1, wherein:
   the shaft is a shaft for a motor gear; and
   the shaft holder is a gear case of an adjusting drive in a motor vehicle.

3. The arrangement as claimed in claim 1, wherein:
   said means for mounting the buffer component so as to be fixed comprises mutually engageable guide noses provided respectively on the buffer component and the shaft holder, said guide noses having mutually complementary guide surfaces slidable axially against one another.

4. An arrangement for performing an adjustment of an axial play between a shaft and a buffer component securable in a shaft holder, whereby the adjustment adjusts an actual axial play, arising from manufacturing tolerances, substantially to a desired axial play, the arrangement comprising:
   a) means for mounting the buffer component in the shaft holder so as to be rotatable, during the adjustment of the axial play, about a pivot axis extending essentially orthogonally to a lengthwise axis of the shaft;
   b) means for mounting the buffer component in the shaft holder so as to be fixed, without support from the shaft, following the adjustment of the axial play; and
   c) a circumferential buffer surface provided on the buffer component and extending eccentrically relative to the pivot axis, said buffer surface having both a minimum radial distance and a maximum radial distance from the pivot axis; wherein:
      a difference between the minimum and the maximum radial distance comprises a complete range of the actual axial play between the buffer component and the shaft arising from the manufacturing tolerances; and said circumferential buffer surface comprises a series of contiguous buffer surfaces.

5. The arrangement as claimed in claim 4, wherein:

said circumferential buffer surface follows an Archimedean spiral and comprises adjoining individual buffer surfaces, each said buffer surface extending substantially tangentially to the Archimedean spiral.

6. The arrangement as claimed in claim 5, wherein:

each of said individual buffer surfaces has a leading edge and a trailing edge; and each of said individual buffer surfaces has a minimum radial distance from the pivot axis of the buffer component in a location intermediate between the leading edge and the trailing edge.

7. The arrangement as claimed in claim 6, wherein:

a radial distance from the trailing edge of a given buffer surface to the shaft, when the buffer component is rotated to position the trailing edge so as to face the shaft and intersect the lengthwise axis of the shaft, is defined as a first distance;

a radial distance from the intermediate location of the given buffer surface to the shaft, when the buffer component is rotated to position the intermediate location so as to face the shaft and intersect the lengthwise axis of the shaft, is defined as a second distance; and the difference between the first distance and the second distance corresponds to the desired axial play.

8. The arrangement as claimed in claim 5, wherein:

said means for mounting the buffer component so as to be fixed fixes the buffer component in the shaft holder with a selected one of said individual buffer surfaces extending essentially orthogonally to the lengthwise axis of the shaft.

9. The arrangement as claimed in claim 8, wherein:

said means for mounting the buffer component so as to be fixed latches the buffer component in the shaft holder.

10. The arrangement as claimed in claim 1, wherein:

each of said buffer surfaces has a leading edge and a trailing edge; and each of said buffer surfaces has a minimum radial distance from the pivot axis of the buffer component in a region intermediate between the leading edge and the trailing edge.

11. The arrangement as claimed in claim 10, wherein:

a radial distance from the trailing edge of a given buffer surface to the shaft, when the buffer component is rotated to position the trailing edge so as to face the shaft and intersect the lengthwise axis of the shaft, is defined as a first distance;

a radial distance from the intermediate location of the given buffer surface to the shaft, when the buffer component is rotated to position the intermediate location so as to face the shaft and intersect the lengthwise axis of the shaft, is defined as a second distance; and the difference between the first distance and the second distance corresponds to the desired axial play.

12. The arrangement as claimed in claim 4, wherein:

said means for mounting the buffer component so as to be fixed fixes the buffer component in the shaft holder with a selected one of said buffer surfaces extending essentially orthogonally to the lengthwise axis of the shaft.

13. The arrangement as claimed in claim 12, wherein:

said means for mounting the buffer component so as to be fixed latches the buffer component in the shaft holder.

14. The arrangement as claimed in claim 13, wherein:

said means for mounting the buffer component so as to be rotatable comprises a pivot on which the buffer component is rotatable in a circumferential direction until inhibition of rotation occurs, whereby the arrangement produces a predetermined axial-play adjustment; and said means for mounting the buffer component so as to be fixed comprises means for axially displacing the buffer component from an axial position in which the buffer component is rotatable to an axial position in which the buffer component is fixed.

15. The arrangement as claimed in claim 14, wherein:

said means for mounting the buffer component so as to be fixed comprises mutually engageable guide noses provided respectively on the buffer component and the shaft holder, said guide noses having mutually complementary guide surfaces slidable axially against one another.

16. The arrangement as claimed in claim 12, wherein:

said means for mounting the buffer component so as to be rotatable comprises a pivot on which the buffer component is rotatable in a circumferential direction until inhibition of rotation occurs, whereby the arrangement produces a predetermined axial-play adjustment; and said means for mounting the buffer component so as to be fixed comprises means for axially displacing the buffer component from an axial position in which the buffer component is rotatable to an axial position in which the buffer component is fixed.

17. The arrangement as claimed in claim 12, wherein:

said means for mounting the buffer component so as to be fixed comprises mutually engageable guide noses provided respectively on the buffer component and the shaft holder, said guide noses having mutually complementary guide surfaces slidable axially against one another.

18. The arrangement as claimed in claim 1, wherein:

said means for mounting the buffer component so as to be rotatable comprises a pivot on which the buffer component is rotatable in a circumferential direction until inhibition of rotation occurs, whereby the arrangement produces a predetermined axial-play adjustment; and said means for mounting the buffer component so as to be fixed comprises means for axially displacing the buffer component from an axial position in which the buffer component is rotatable to an axial position in which the buffer component is fixed.

19. The arrangement as claimed in claim 18, wherein:

said pivot comprises a journal held in the shaft holder; and the buffer component comprises a rotary sleeve for receiving said journal; whereby the buffer component is rotatable in a first axial mounting position and is fixed against rotation in a second axial mounting position offset from the first mounting position.

20. The arrangement as claimed in claim 19, wherein:

said journal is integrally formed with the shaft holder.

21. The arrangement as claimed in claim 18, wherein:

the buffer component comprises a journal; and said shaft holder comprises a rotary sleeve for receiving said journal; whereby the buffer component is rotatable in a first axial mounting position and is fixed against rotation in a second axial mounting position offset from the first mounting position.

22. The arrangement as claimed in claim 21, wherein:

said journal is integrally formed with the buffer component.

23. The arrangement as claimed in claim 18, wherein:

the shaft holder comprises an orifice for receiving the buffer component;

in the axial position in which the buffer component is rotatable, the buffer component rotates on an axial end of said pivot and is partly recessed into the orifice; and in the axial position in which the buffer component is fixed, the buffer component contacts a shaft portion of said pivot and is fully recessed into the orifice in a positive locking fashion.

24. The arrangement as claimed in claim 23, wherein:

said axial end and said shaft portion of said pivot are concentric about the pivot axis; and said axial end has a maximum radius greater than a maximum radius of said shaft portion.

25. The arrangement as claimed in claim 23, wherein:

the buffer component comprises a cover piece at an axial end of the buffer component, said cover piece being configured to seal the buffer component tightly within the orifice of the shaft holder.

26. The arrangement as claimed in claim 25, wherein:

the buffer component is positioned in the axial position in which the buffer component is fixed; and the cover piece of the buffer component is welded to a rim region of the orifice.

27. A gear case of a motor drive, comprising:

a shaft holder;

a gear shaft mounted in said shaft holder, said gear shaft being rotatable around a shaft axis; and a buffer component mounted in said shaft holder at an axial end of said gear shaft, said buffer component being provided to absorb an excessive axial play of said gear shaft in said shaft holder; wherein:

said buffer component has a central axis substantially intersecting the shaft axis and extending substantially orthogonally to the shaft axis;

said buffer component is oriented so that a portion of an outer periphery of said buffer component faces the axial end of said gear shaft;

said buffer component comprises a plurality of contiguous, substantially planar buffer surfaces arranged about the periphery of said buffer component; and said buffer surfaces each define a radial offset from the central axis of said buffer component and together provide at least three discrete gradations of radial offset from the central axis of said buffer component.

28. The gear case according to claim 27, wherein:

said buffer surfaces together provide at least ten gradations of radial offset from the central axis of said buffer component.

29. The gear case according to claim 27, wherein:

each said buffer surface has a leading edge separating said buffer surface from a first adjoining buffer surface and has a trailing edge separating said buffer surface from a second adjoining buffer surface.

30. The gear case according to claim 27, wherein:

each said buffer surface has a minimum radial distance from the central axis of said buffer component, the minimum radial distance being substantially equal to the radial offset defined by said buffer surface.

31. The gear case according to claim 30, wherein:

the minimum radial distance of each said buffer surface defines a respective point on said buffer surface; and the point substantially intersects an Archimedean spiral originating at the central axis of said buffer component.

32. The gear case according to claim 31, wherein:

each said buffer surface extends substantially parallel to the central axis of said buffer component and extends substantially tangentially to the Archimedean spiral.

33. The gear case according to claim 27, wherein:

said buffer component further comprises a plurality of engagement projections on an axial end of said buffer component; and said shaft holder comprises a plurality of engagement recesses mated respectively with said engagement projections.

34. The gear case according to claim 27, wherein:

said shaft holder comprises a peg; and said buffer component further comprises a central, axial orifice mated with said peg.

35. A method for adjusting an axial play of a gear shaft in a shaft holder, comprising the steps of:

(A) mounting the gear shaft in the shaft holder, the gear shaft having an excessive play along a rotation axis of the gear shaft;

(B) mounting a buffer component in the shaft holder at at least one axial end of the gear shaft without being supported by the axial end of the gear shaft, wherein:

the buffer component is mounted to be rotatable about a pivot that is essentially orthogonal to the axis of the gear shaft;

the buffer component is mounted to be movable axially along the pivot from a first position in which the buffer component is rotatable about the pivot to a second position in which the buffer component is rotationally and axially fixed within the shaft holder; and the buffer component has a circumferential buffer surface extending eccentrically relative to the pivot, thereby providing a plurality of gradations of radial offset from the pivot;

(C) placing the buffer component in the first position and rotating the buffer component about the pivot, thereby selecting a desired one of the plurality of gradations corresponding to a desired axial play between the buffer component and the gear shaft; and (D) moving the buffer component axially from the first position to the second position.

36. The method according to claim 35, wherein:

said step (D) comprises mating at least one engagement projection provided on one of the buffer component and the shaft holder with at least one engagement recess provided on one of the shaft holder and the buffer component.

37. The method according to claim 35, wherein:

the circumferential buffer surface comprises a plurality of substantially planar surfaces, each extending essentially parallel to the pivot, each bounded circumferentially by a leading edge and a trailing edge, and each corresponding to one of the plurality of gradations of radial offset.

38. The method according to claim 37, wherein:

said step (D) comprises rotationally fixing the buffer component within the shaft holder in a rotational setting in which one of the planar surfaces facing the gear shaft extends substantially orthogonally to the axis of the gear shaft.

39. The method according to claim 37, wherein:

said step (C) comprises the steps of:

rotating the buffer component circumferentially in a first direction until the trailing edge of a given one of the planar surfaces contacts the gear shaft; and rotating the buffer component circumferentially in a direction opposite the first direction until the given planar surface extends substantially orthogonally to the axis of the gear shaft.

* * * * *